(12) United States Patent
Yeh et al.

(10) Patent No.: US 9,280,250 B2
(45) Date of Patent: Mar. 8, 2016

(54) METHOD, STORAGE MEDIUM, AND ELECTRONIC APPARATUS FOR CALIBRATING TOUCH SCREEN

(71) Applicant: EGALAX_EMPIA TECHNOLOGY INC., Taipei (TW)

(72) Inventors: Shang-Tai Yeh, Taipei (TW); Jen-Yi Sun, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 167 days.

(21) Appl. No.: 14/105,743

(22) Filed: Dec. 13, 2013

(65) Prior Publication Data

US 2014/0168155 A1    Jun. 19, 2014

(30) Foreign Application Priority Data

Dec. 14, 2012  (TW) .............................. 101147308 A

(51) Int. Cl.
  *G06F 3/045* (2006.01)
  *G06F 3/041* (2006.01)

(52) U.S. Cl.
  CPC .............. *G06F 3/045* (2013.01); *G06F 3/0418* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 7,274,356 | B2 * | 9/2007 | Ung et al. | ...................... 345/158 |
| 2005/0078095 | A1 * | 4/2005 | Ung et al. | ...................... 345/175 |
| 2009/0046079 | A1 | 2/2009 | Inoue et al. | |

* cited by examiner

*Primary Examiner* — Van Chow
(74) *Attorney, Agent, or Firm* — WPAT, PC; Justin King

(57) ABSTRACT

The present invention provides a calibration method of a touch screen which comprises a display module and a sensor module. The calibration method comprises the following steps: receiving coordinate values of multiple display points shown on the display module; receiving coordinate values of multiple sensing points received by the sensor module, wherein the multiple sensing points are corresponding to the multiple display points, respectively, for forming at least four multiple correspondences; calculating a first set of calibration formulas according to the multiple correspondences; adjusting the multiple sensing points according to the first set of calibration formulas; and calculating a second set of calibration formulas according to the adjusted sensing points.

14 Claims, 10 Drawing Sheets

METHOD, STORAGE MEDIUM, AND ELECTRONIC APPARATUS FOR CALIBRATING TOUCH SCREEN

CROSS REFERENCE TO RELATED APPLICATIONS

This application claims priority under 35 U.S.C. 119 to Taiwan patent application, TW101147308, filed on Dec. 14, 2012, the disclosure of which is incorporated herein by reference.

BACKGROUND OF THE INVENTION

1. Field of the Invention

The present invention relates to touch screen, and more particularly, to apparatus and method for calibrating touch screen.

2. Description of the Prior Art

Touch screen is an important human machine interface of modern electronic products. It is widely adopted in various consumer electronic products such as smartphone, tablet computer, notebook, and etc. Usually, touch screen comprises a display module and a sensor module coupled to the display module. User may use a part of human body, e.g., finger, or a stylus pen to touch or to approximate the sensor module. A processing device of the touch screen receives the sensed information sent from the sensor module. The sensed information usually comprises location information corresponding to the touch or approximation manipulated by user. Normally, the location information is represented with respect to a coordinate system of the touch screen.

The input of user is also usually corresponding to the output of the display module. For example, in case a confirmation dialog is pop up on the display module, it requires user to touch a button in the dialog to go on when finish reading the confirmation information shown in the dialog. User needs to use his/her finger or stylus to touch the button in order to dismiss the confirmation dialog.

In the example above, the area of button shown in the display module can be defined by four points in the coordinate system. After user inputs, the sensed touch information received by the processing device comprises at least one location coordinate. If the location coordinate is within the area defined by the four points, the processing device determines that user already touch the button; otherwise, the processing device keeps the confirmation dialog shown on the display module.

One of conditions that the simple example executes successfully is the coordinate system is applicable to the touch system. In other words, the display module and the coupled sensor module use the same coordinate system. If coordinate systems corresponding to the display module and the sensor module are not consistent, the simple example cannot successfully execute. Hence, during the manufacture and packaging of the touch screen, it is required to make sure of the coordinate systems corresponding to the display module and the sensor module is consistent completely.

However, in real world environments, due to the limitations imposed by manufacture skills, tools, and material, it is almost impossible to have completely consistent coordinate systems corresponding to the display module and the sensor module. In other words, the coordinate system of the display module cannot be one-on-one mapping to the coordinate system of the sensor module. Hence, there exists a need to calibrate these two coordinate systems.

The following example is applicable to resistive touch screen for explaining why there are errors happening between these two coordinate systems and the mathematical representations of the errors. People ordinary skilled in the art are able to understand that the scope of the present invention is not limited to resistive touch screen. As long as the calibration method and device provided by the present invention are applicable to calibrate these two coordinate systems, it falls into the scope of the present invention.

Please refer to FIG. 1, which shows a profiling diagram of a sensor module 1000 of a traditional resistive touch screen. The sensor module 1000 can be viewed as a multi layered structure. Light can pass through the top glass layer 1101 and the bottom glass layer 1102 which provide structural strength to protect inner layers.

In the middle of sandwich structure is a glass bead layer 1300 which comprises a plurality of glass beads used for separating two resistive film layers 1201 and 1202. Because of the glass bead layer 1300, the distance between these two resistive film layers 1201 and 1202 is roughly the same. These two resistive film layers 1201 and 1202 can be conductive films attached to the glass layers 1101 and 1102, respectively.

When user presses the top glass layer 1101, the glass layer 1101 and the resistive film layer 1201 are forced to deform such that the resistive film layer 1201 touches the resistive film layer 1202 where no glass bead laid in between. When the pressed point gets closer to glass bead, the pressure given by user has to be higher in order to deform the glass layer 1101 such that two resistive film layers 1201 and 1202 touch each other. Hence, the space interval between glass beads of the glass bead layer 1300 determines the resolution of the sensor module 1000.

One of the resistive film layers 1201 and 102 is coupled to a power source having a first voltage, and another one is coupled to a power source having a second voltage. When these two resistive film layers 1201 and 1202 touches, a processing module (not shown in FIG. 1) attached to the sensor module 1000 could determine where is pressed according to the voltage values readout.

Several errors may occur in the process of the processing module determining the pressed point, for example, electric interference, mechanical error, scaling factor, or unstable pressure given by user. There are many causes to introduce electric interferences. Most of them come from electromagnetic interference introduced by internal components of electronic system. Especially to touch sensor module sensing tiny electric current by high resistive circuit, low pass filter may be required in front of analog to digital converter. The software executed by the processing module or corresponding logic circuit not only filter out unreasonable burst interference data but also correct and predict the pressure instability cause by user.

Please refer to FIG. 2, which illustrates a diagram of errors of a touch screen. As mentioned already, the touch screen comprises a display module and a sensor module. A circle and an ellipse are shown in FIG. 2. The circuit represents a graph outputted from the display module. However, due to mentioned mechanical errors and scaling factors, what the circle maps to the sensor module becomes the ellipse. The ellipse is rotated. Its center is shifted. And a semi-major axis and a semi-minor axis are generated because of different scaling factors corresponding to these two axes. Therefore, there is a need to have a mathematic model to describe the two coordinate systems of the display module and the sensor module. After having a correct representation, calibration method could be found out in consequence.

Please refer to FIG. 3, which depicts a schematic diagram of mathematical representation of errors of a touch screen. There is a coordinate system of the touch screen shown in FIG. 3. For convenience, the coordinate system is assumed as the coordinate system of the display module. There are two points P1 and P2 shown in FIG. 3 and two vectors are formed between these two points and the original point, respectively. These two points or vectors are mapping to two coordinate systems of the display module and the sensor module, respectively. In other words, when the user presses the point P1, the sensor module reports the point P2.

Thus, there is a need to have a transformation matrix M to convert the coordinates of the sensor module to the coordinates of the display module. The relationship of these two points and the transformation matrix M could be represented as Formula (1) below:

$$P1 = M \times P2 \qquad \text{Formula (1)}$$

Put it in another way, if elements of the transformation matrix M could be found, it is possible to convert P2 to P1.

If using two orthogonal axes (X, Y) coordinate to represent these two vectors/points, Formula (2a) and (2b) are described below:

$$P1 = [X1, Y1] = [R1 \cos \Theta1, R1 \sin \Theta1] \qquad \text{Formula (2a)}$$

$$P2 = [X2, Y2] = [R2 \cos \Theta2, R2 \sin \Theta2] \qquad \text{Formula (2b)}$$

If the mentioned error comprises a rotation error $\Theta r$, P1 could be rewritten as Formula (3) below:

$$P1 = [R2 \cos(\Theta2+\Theta r), R2 \sin(\Theta2+\Theta r)] \qquad \text{Formula (3)}$$

Considering the scaling factors with respect to the semi-major and semi-minor axes are different, in case the scaling factors with respect to X and Y axes are denoted as Kx and Ky, P1 could be further represented as Formula (4) below:

$$P1 = [Kx\, R2 \cos(\Theta2+\Theta r), Ky\, R2 \sin(\Theta2+\Theta r)] \qquad \text{Formula (4)}$$

At last, considering the shift error, in case the vector of the shift error is denoted as (Dx, Dy), P1 could be further represented as Formula (5) below:

$$P1 = [Kx\, R2 \cos(\Theta2+\Theta r)+Dx, Ky\, R2 \sin(\Theta2+\Theta r)+Dy] \qquad \text{Formula (5)}$$

In practical, the rotation error is quite small. So it is safe to assume that $\sin \Theta r$ is approximated to $\Theta r$ and $\cos \Theta r$ is approximated to 1. Hence, two approximation Formulas (6a) and (6b) could be introduced below:

$$\cos(\Theta2+\Theta r) \sim \cos(\Theta2 - \Theta r \sin \Theta2) \qquad \text{Formula (6a)}$$

$$\sin(\Theta2+\Theta r) \sim \sin(\Theta2 + \Theta r \cos \Theta2) \qquad \text{Formula (6b)}$$

After bringing these two Formulas (6a) and (6b) into Formula (5), Formula (7) is generated below:

$$P1 = [Kx\, R2 \cos\Theta2 - \Theta r Kx R2 \sin\Theta2 + Dx,\, Ky\, R2 \sin\Theta2 + \Theta r Ky R2 \cos\Theta2 + Dy] \qquad \text{Formula (7)}$$

If rewriting Formula (7) with respect to coordinate values, Formula (8) is generated accordingly:

$$P1 = [X1, Y1] = [Kx\, X1 - \Theta r Kx\, Y2 + Dx,\, Ky\, X2 + \Theta r Ky\, Y2 + Dy] \qquad \text{Formula (8)}$$

Once rewriting the coefficients of Formula (8) and separating Formula (8) with respect to X and Y axes, Formulas (9a) and (9b) could be derived below:

$$X1 = A\,X2 + B\,Y2 + C \qquad \text{Formula (9a)}$$

$$Y1 = D\,X2 + E\,Y2 + F \qquad \text{Formula (9b)}$$

Formulas (9a) and (9b) look quite clean. Assuming that the rotation error is very small, using these two Formula (9a) and (9b) can convert coordinates between coordinate systems corresponding to the display module and the sensor module. After describing the error in mathematical model, the present application can provide the following embodiments based on the descriptions.

SUMMARY OF THE INVENTION

The present invention provides a calibration method of a touch screen which comprises a display module and a sensor module. The calibration method comprises the following steps: receiving coordinate values of multiple display points shown on the display module; receiving coordinate values of multiple sensing points received by the sensor module, wherein the multiple sensing points are corresponding to the multiple display points, respectively, for forming at least four multiple correspondences; calculating a first set of calibration formulas according to the multiple correspondences; adjusting the multiple sensing points according to the first set of calibration formulas; and calculating a second set of calibration formulas according to the adjusted sensing points.

The present invention provides a storage medium for calibrating touch screen. The computer readable signals contained in the storage medium commands a control device of an electronic apparatus executing a calibration method for calibrating a touch screen of the electronic apparatus. The touch screen comprises a display module and a sensor module. The calibration method comprises the following steps: receiving coordinate values of multiple display points shown on the display module; receiving coordinate values of multiple sensing points received by the sensor module, wherein the multiple sensing points are corresponding to the multiple display points, respectively, for forming at least four multiple correspondences; calculating a first set of calibration formulas according to the multiple correspondences; adjusting the multiple sensing points according to the first set of calibration formulas; and calculating a second set of calibration formulas according to the adjusted sensing points.

The present invention provides an electronic apparatus for calibrating touch screen. The electronic apparatus comprises a storage medium contained in the storage medium commands a control device of the electronic apparatus executing a calibration method for calibrating a touch screen of the electronic apparatus. The touch screen comprises a display module and a sensor module. The calibration method comprises the following steps: receiving coordinate values of multiple display points shown on the display module; receiving coordinate values of multiple sensing points received by the sensor module, wherein the multiple sensing points are corresponding to the multiple display points, respectively, for forming at least four multiple correspondences; calculating a first set of calibration formulas according to the multiple correspondences; adjusting the multiple sensing points according to the first set of calibration formulas; and calculating a second set of calibration formulas according to the adjusted sensing points.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
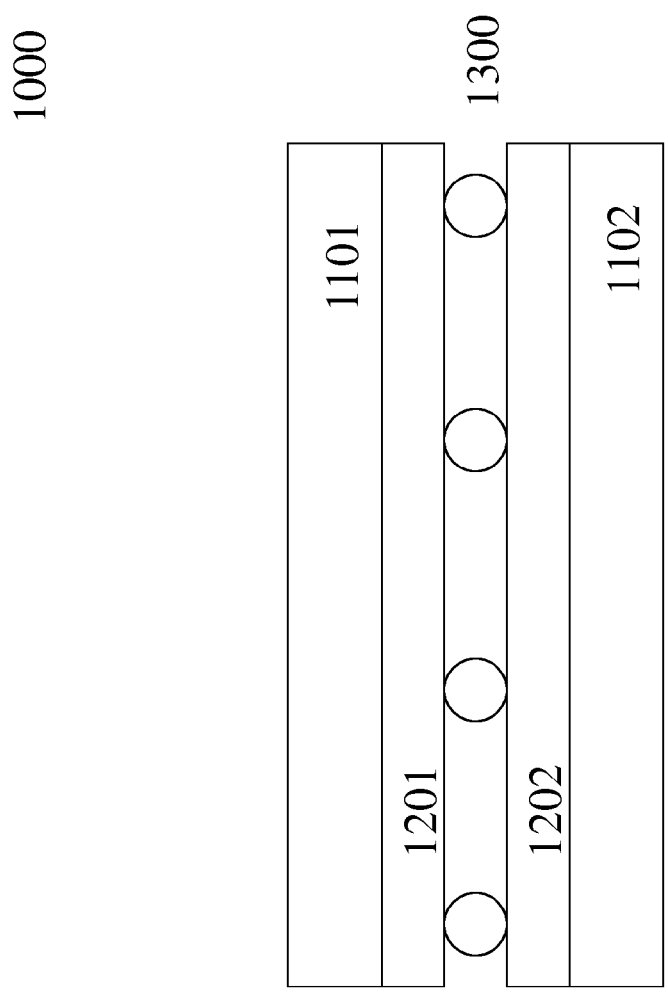
FIG. 1 shows a profiling diagram of a sensor module of a traditional resistive touch screen.
Figure 2:
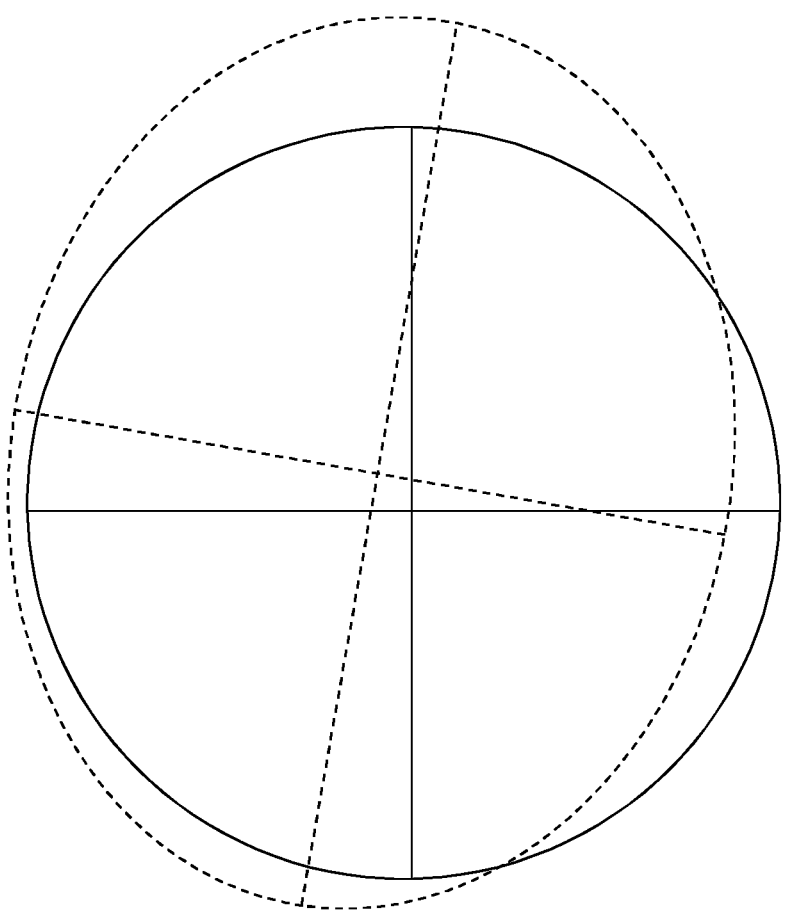
FIG. 2 illustrates a diagram of errors of a touch screen.
Figure 3:
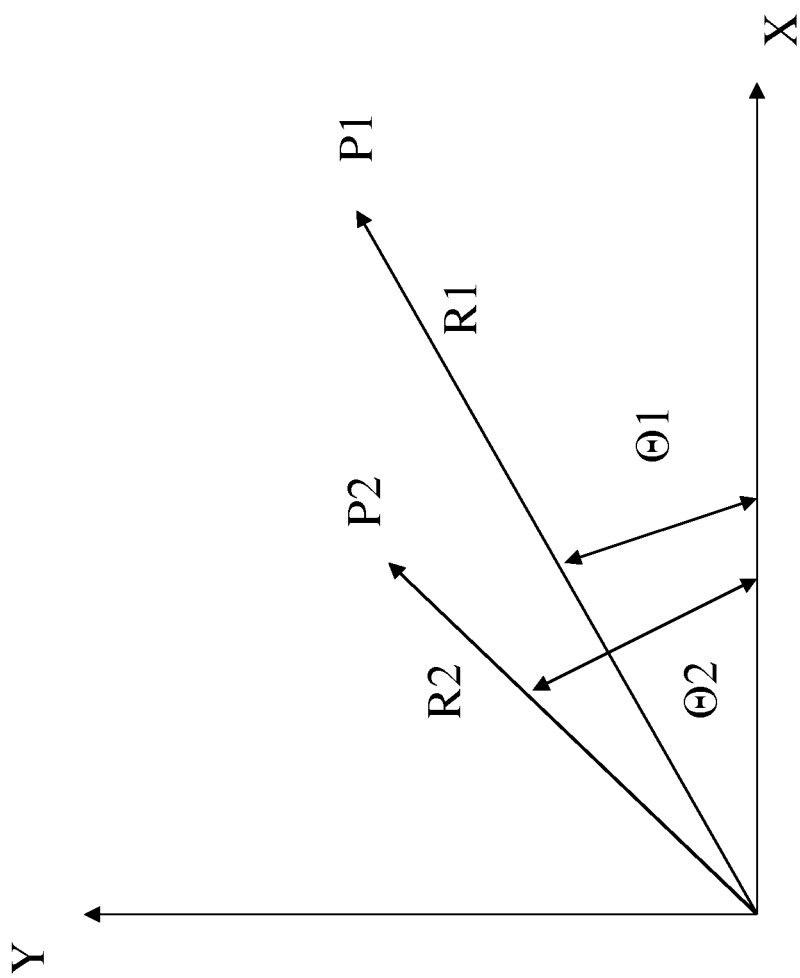
FIG. 3 depicts a schematic diagram of mathematical representation of errors of a touch screen.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

In the prior art, the present application already provides a mathematical model for describing the errors, i.e., Formula (9a) and (9b). In the following paragraphs, how to find out those six parameters A to F is described below.

Since the processing device of the touch screen is aware of the point P1 shown in the display module and the point P2 reported by the sensor module, the variables X1, Y1, X2, and Y2 are known. In order to solve six unknown parameters A to F, at least six simultaneous equations are required. In other words, the corresponding pair P1 and P2 can derive two equations. It needs additional two pairs for deriving the rest four equations. In one embodiment of the present invention, the display module provides two points, P3 and P5, and the sensor module reports corresponding two points, P4 and P6, respectively. The six simultaneous equations may be represented below:

$$X1 = A\,X2 + B\,Y2 + C \quad \text{Formula (9a)}$$

$$Y1 = D\,X2 + E\,Y2 + F \quad \text{Formula (9b)}$$

$$X3 = A\,X4 + B\,Y4 + C \quad \text{Formula (9c)}$$

$$Y3 = D\,X4 + E\,Y4 + F \quad \text{Formula (9d)}$$

$$X5 = A\,X6 + B\,Y6 + C \quad \text{Formula (9e)}$$

$$Y5 = D\,X6 + E\,Y6 + F \quad \text{Formula (9f)}$$

Consequently, these six parameters A to F could be calculated. Because it may take too long to elaborate, the present application only shows the result. People ordinary skilled in the art can understand the following Formula (10) can represent these six parameters A to F.

$$A = ((X1-X5)(Y4-Y6)-(X3-X5)(Y2-Y6))/K$$

$$B = ((X2-X6)(X3-X5)-(X1-X5)(X4-X6))/K$$

$$C = ((Y2(X6 \times 3 - X4 \times 5) + Y4(X2 \times 5 - X6 \times 1) + Y6(X4 \times 1 - X2 \times 3))/K$$

$$D = ((Y1-Y5)(T4-Y6)-(Y3-Y5)(Y2-Y6))/K$$

$$E = (X2-X6)(Y3-Y5)-(Y1-Y5)(X4-X6))/K$$

$$F = (Y2(X6Y3-X4Y5)+Y4(X2Y5-X6Y1)+Y6(X4Y1-X2Y3))/K$$

$$K = (X1-X5)(Y3-Y5)-(X3-X5)(Y1-Y5) \quad \text{Formula (10)}$$

In short, according to the three points, P1, P3, and P5 provided by the display module and the corresponding three points P2, P4, and P6 provided by the sensor module, putting their coordinate values into Formula (10), the six parameters A to F of Formula (9a) and (9b) can be calculated accordingly. In the present application, Formula (9a) and (9b) used to calibration are called calibration formulas. People ordinary skilled in the art can understand any point inputted to the sensor module can be calibrated by applying the fore-mentioned calibration formulas.

Figure 4:
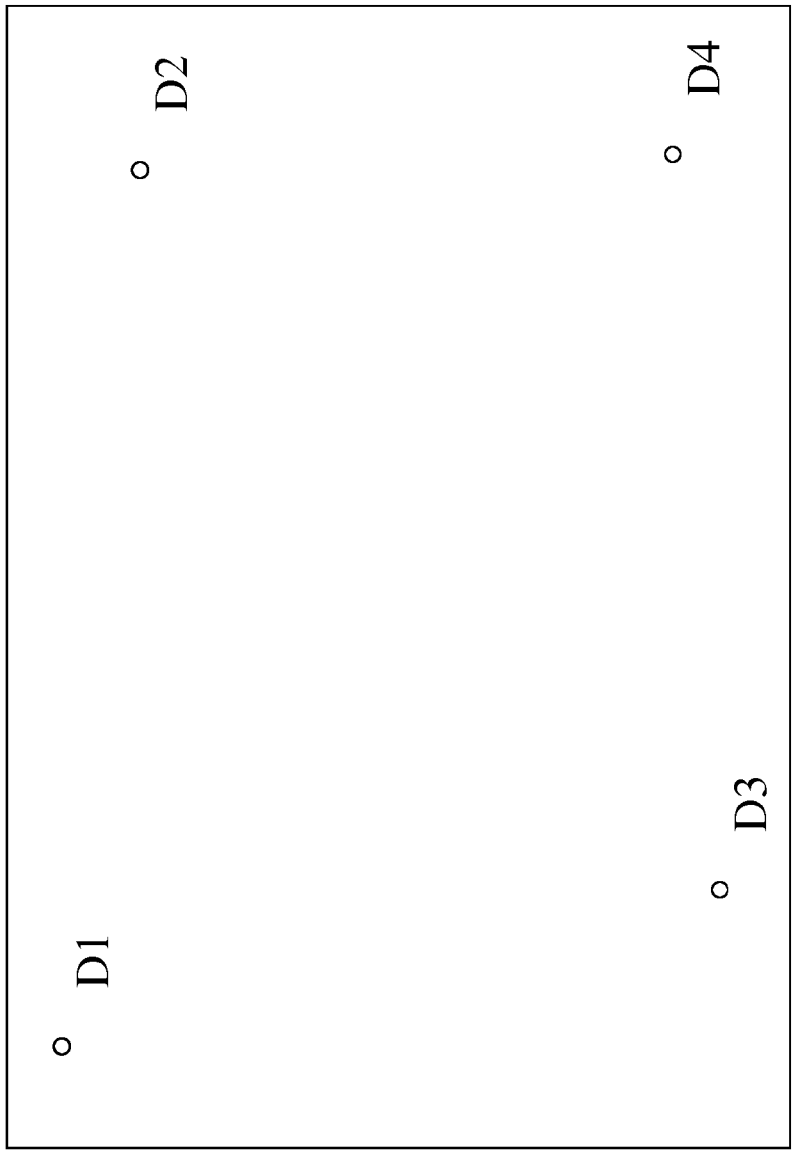
FIG. 4 depicts a diagram of a touch screen according to an embodiment of the present invention.

Please refer to FIG. 4, which depicts a diagram of a touch screen according to an embodiment of the present invention. As described above, the touch screen 4000 comprises a display module and a stacking sensor module corresponding to the display module. The frame shown in FIG. 4 is the stacked area of the display module and the sensor module. The sensor module may comprise but not limit to the following types: resistive, matrix resistive, capacitive, projected capacitive, electromagnetic sensing, infra-red sensing, surface acoustic wave, camera, and in-cell. People ordinary skilled in the art can understand that the present invention does not limit the types of the display module and the sensor module. As long as that it is required to calibrate the coordinate systems between the display module and the sensor module, the method and apparatus provided by the present invention are applicable. Type of the sensor modules are not the key of the present application. So no further description is elaborated here.

The frame shown in FIG. 4 comprises four display points D1 to D4 with known coordinate values. These four display points may be any four points in the sensing area. However, in a preferred embodiment, setting up locations of these four points may consider the following conditions. For example, the area defined by these four points should be as large as possible; distance between any two points should be as large as possible; and no points are too closed to the edges of the sensor module.

These display points may be shown one-by-one or all at once on the display module. The corresponding input sensing points U1 to U4 can be received by the processing device. In one embodiment, the processing device can further verify whether the correspondence exists between the sensing point U1 and the display point D1. For example, in case that the distance between these two points should not be larger than a threshold. If the distance is larger than the threshold, the sensing point U1 should be inputted again.

Figure 5:
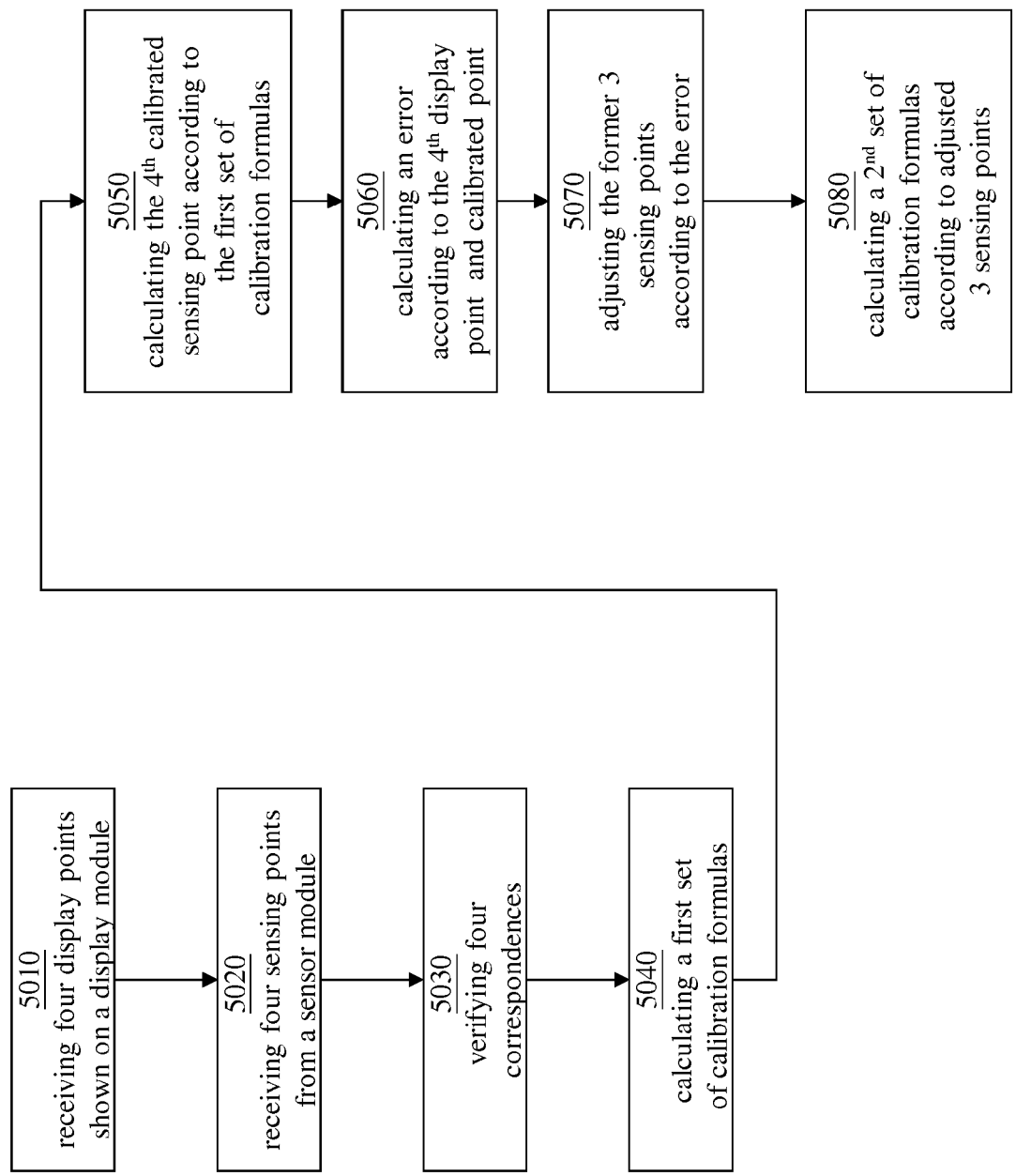
FIG. 5 illustrates a flowchart diagram of a calibration method according to an embodiment of the present invention.

Please refer to FIG. 5, which illustrates a flowchart diagram of a calibration method according to an embodiment of the present invention. One of the objectives of the calibration method is to define a set of calibration formulas (9a) and (9b). The calibration method is applicable to the processing device of the touch screen. As shown in FIG. 4, in Step 5010, the processing device receives coordinate values of the four display points, D1 to D4, shown in the display modules. After that, in Step 5020, the processing device receives coordinate values of the four sensing points, U1 to U4, from the sensor module, respectively corresponding to the display points, D1 to D4.

As mentioned above, in optional Step 5030, the processing device verifies the correspondences between the display point and the sensing point. The display points can be shown one-by-one or all at once on the display module, the corresponding points U1 and U4 can be received by the processing device. In one embodiment, the processing device can verify whether there exists a correspondence between the sensing point U1 and the display point D1. For example, the distance between these two points should not be larger than a threshold; otherwise, the sensing point U1 should be inputted again.

After confirming the correspondences between these four pairs of display points and sensing points, the processing device executes Step 5040, i.e., using three correspondences out of the four correspondences to calculate the first set of calibration formulas. In one embodiment, the three correspondences taken in Step 5040 are U1 and D1, U2 and D2, as well as U3 and D3. Since the six pairs of coordinate values of these three display points D1 to D3 and those three sensing point U1 to U3 are known, the six parameters A to F of the calibration formulas (9a) and (9b) could be calculated by putting them into Formula (10). In the present application, the formulas generated in Step 5040 are called a first set of calibration formulas.

After the first set of calibration formulas is generated, the processing device places the coordinate values of the fourth display point D4 into the first set of calibration formulas in Step 5050 in order to calculate a calibrated point U'4 of the fourth sensing point U4. In response to the calculated coordinate values of the calibrated point U'4, the processing device calculates an error E4 between the fourth sensing point U4 and the calibrated point U'4 in Step 5060. In the present application, the error E3 may be a vector from the fourth sensing point U4 to its calibrated point U'4, represented as a pair of coordinate values, or a inverse vector from the calibrated point U'4 to the fourth sensing point U4. In some circumstance, the error E4 may be referred to an absolute value of the length of the vectors.

Although there is transformation error between the coordinate systems of the display module and the sensor module, the transformation can be linear in an ideal situation. In practical, the first calibration formulas generated in Step 5040 not only applies to the sensing points U1 to U3 but also to the fourth sensing point U4 such that there is no error E4 between the fourth sensing point U4 and its calibrated point U'4. Or at least the error E4 is too small to be considered. Furthermore, in such an ideal situation, every sensing point in the touch screen 4000 can be linearly transformed to a correct display point.

In the embodiments enjoying the ideal situation, i.e., there is no error E4 between the fourth sensing point U4 and its calibrated point U'4 or at least the error E4 is too small to be considered, the calibration method shown in FIG. 5 is ended after Step 5060. Steps 5070 and 5080 are omitted. It is assumed that a second set of calibration formulas equals to the first set of calibration formulas.

However, in most implementations, the coordinate systems between the sensing module and the display module cannot be transformed one-on-one linearly in the ideal situation. In other words, except for the sensing points U1 to U3 can be correctly transformed into the display points D1 to D3, respectively, by using the first set of calibration formulas, the rest of sensing points may not be able to map to respective display points by using the first set of calibration formulas. The rest of sensing points here comprises the sensing point U4.

In some embodiments in some non-ideal situations, in case the error E4 is large enough, it means that the coordinate systems between the display module and the sensor module are not able to be calibrated using the calibration formulas (9a) and (9b). In such situations, the calibration method ended after Step 5060, too. It is said that the touch screen cannot be calibrated to keep its touch quality above standard.

People ordinary skilled in the art can understand that the assumption of calibration formulas (9a) and (9b) stands if the rotation angel Θr is very small such that sin Θr is approximated to Θr and cos Θr is approximated to 1. If at least one portion of the rotation error Θr between the coordinate systems of the display module and the sensor module exceeds a threshold, it causes the error E4 is too large and the calibration formulas (9a) and (9b) are useless.

If the error E4 is not too small or too large and fallen into a proper interval, the processing device continues executing Step 5070. Since the error E4 are derived from the four sensing points U1 to U4, the error value or vector E4 are equally assigned to the sensing points U1 to U4. In other words, in Step 5070, the error vector E4 is divided by 4 to generate an adjustment E4/4. The adjustment E4/4 is used to adjust the former three sensing points U1 to U3 in order to generate the adjusted sensing points U'1, U'2, and U'3.

For example, in a first adjustment method, the adjusted sensing point U'1 can be the sum of the sensing point U1 and the adjustment E4/4, the adjusted sensing point U'2 can be the difference between the sensing point U2 and the adjustment E4/4, and the adjusted sensing point U'3 can be the difference between the sensing point U3 and the adjustment E4/4. In an alternative example, in a second adjustment method, the adjusted sensing point U'1 can be the difference between the sensing point U1 and the adjustment E4/4, the adjusted sensing point U'2 can be the sum of the sensing point U2 and the adjustment E4/4, and the adjusted sensing point U'3 can be the difference between the sensing point U3 and the adjustment E4/4. In another alternative example, in a third adjustment method, the adjusted sensing point U'1 can be the difference between the sensing point U1 and the adjustment E4/4, the adjusted sensing point U'2 can be the difference between the sensing point U2 and the adjustment E4/4, and the adjusted sensing point U'3 can be the sum of the sensing point U3 and the adjustment E4/4.

In another embodiment, it is assumed that the error E4 is derived from the three sensing points U1 to U3 applying the first set of calibration formulas. Therefore in Step 5070, the adjustment E4/3 is generated by dividing the error E4 by three. Similarly, the adjustment E4/3 are used to adjust the previous three sensing points in order to generate the adjusted sensing points U'1, U'2, and U'3 accordingly.

For example, in a fourth adjustment method, the adjusted sensing point U'1 can be the sum of the sensing point U1 and twice of the adjustment E4/3, the adjusted sensing point U'2 can be the difference between the sensing point U2 and the adjustment E4/3, and the adjusted sensing point U'3 can be the difference between the sensing point U1 and the adjustment E4/3. In an alternative example, in a fifth adjustment method, the adjusted sensing point U'1 can be the difference between the sensing point U1 and the adjustment E4/3, the adjusted sensing point U'2 can be the sum of the sensing point U2 and twice of the adjustment E4/3, and the adjusted sensing point U'3 can be the difference between the sensing point U3 and the adjustment E4/3. In another alternative example, in a sixth adjustment method, the adjusted sensing point U'1 can be the difference between the sensing point U1 and the adjustment E4/3, the adjusted sensing point U'2 can be the difference between the sensing point U2 and the adjustment E4/3, and the adjusted sensing point U'3 can be the sum of the sensing point U3 and twice of the adjustment E4/3.

No matter the dividend of the error E4 is 3 or 4, both falls into the scope of the present application. As long as the previous three sensing points U1 and U3 are adjusted according to the error E4 in order to generate the adjusted sensing points U'1, U'2, and U'3, it fits the scope of the present application. People ordinary skilled in the art can understand that although six adjustment methods are enumerated, adjustment methods applicable to the present invention are not limited to those enumerated.

At last, the processing device executes Step 5080, using the adjusted sensing points U'1, U'2, and U'3 and corresponding display points D1, D2, and D3, respectively. Similarly, since the coordinate values of the three display points D1 to D3 and the adjusted sensing points U'1 to U'3 are known, after putting them into formula (10), a second set of parameters A to F of the calibration formulas (9a) and (9b) can be calculated. In the present application, the calibration formulas with the second set of parameters generated in Step 5080 is called a second set of calibration formulas which are the calibration formulas used to calibrate the sensing point in touch sensing by the processing device.

Figure 6:
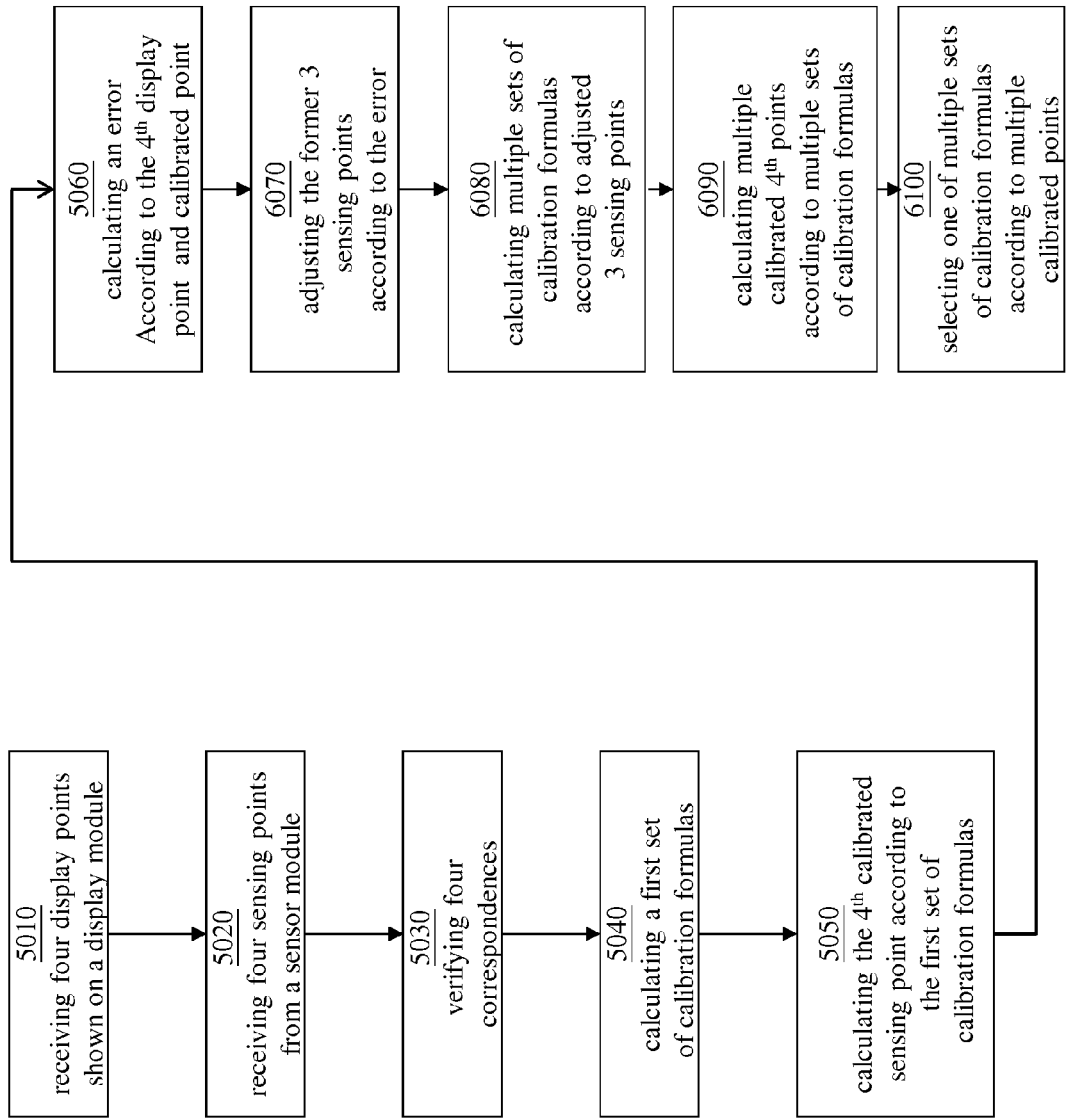
FIG. 6 illustrates a flowchart of a calibration method in accordance with an embodiment of the present invention.

Please refer to FIG. 6, which illustrates a flowchart of a calibration method in accordance with an embodiment of the present invention. Comparing with the calibration method shown in FIG. 5, Steps 5010 to 5060 are as the same as those steps shown in FIG. 5, no duplicated description are elaborated here. People ordinary skilled in the art can understand that the major difference between FIG. 5 and FIG. 6 is that the calibration method shown in FIG. 5 predetermined an adjustment method and the calibration method shown in FIG. 6 further dynamically compares multiple adjustment methods and selects a better one from these multiple methods.

Step 6070 is executed after the Step 5060. In Step 6070, the previous sensing points U1 to U3 are adjusted according to the error E4. In the fore mentioned paragraphs, the present application enumerated six adjustment methods already and more suitable adjustment methods can be also applied to the present invention. Hence, the concept of Step 6070 is to adjust the previous sensing points U1 to U3 according to multiple adjustment methods in order to generate a plurality of sets of adjusted sensing points U'1, U'2, and U'3.

In consequent Step 6080, the plurality of sets of adjusted sensing points U'1, U'2, and U'3 and the corresponding fixed display points D1, D2, and D3, are put into formula (10) for generating multiple sets of parameters A to F. Accordingly, a plurality of sets of calibration formulas are generated.

After that, in Step 6090, multiple of adjusted calibrated points U'4 are generated according to the plurality of sets of calibration formulas. At last, in Step 6100, comparing the multiple of adjusted calibrated points U'4 with the display point D4 to determine which one of multiple U'4 is closest to the display point D4. According to the determined U'4, a corresponding set of calibration formulas is selected accordingly as the second set of calibration formulas used in touch sensing by the processing device.

Figure 7:
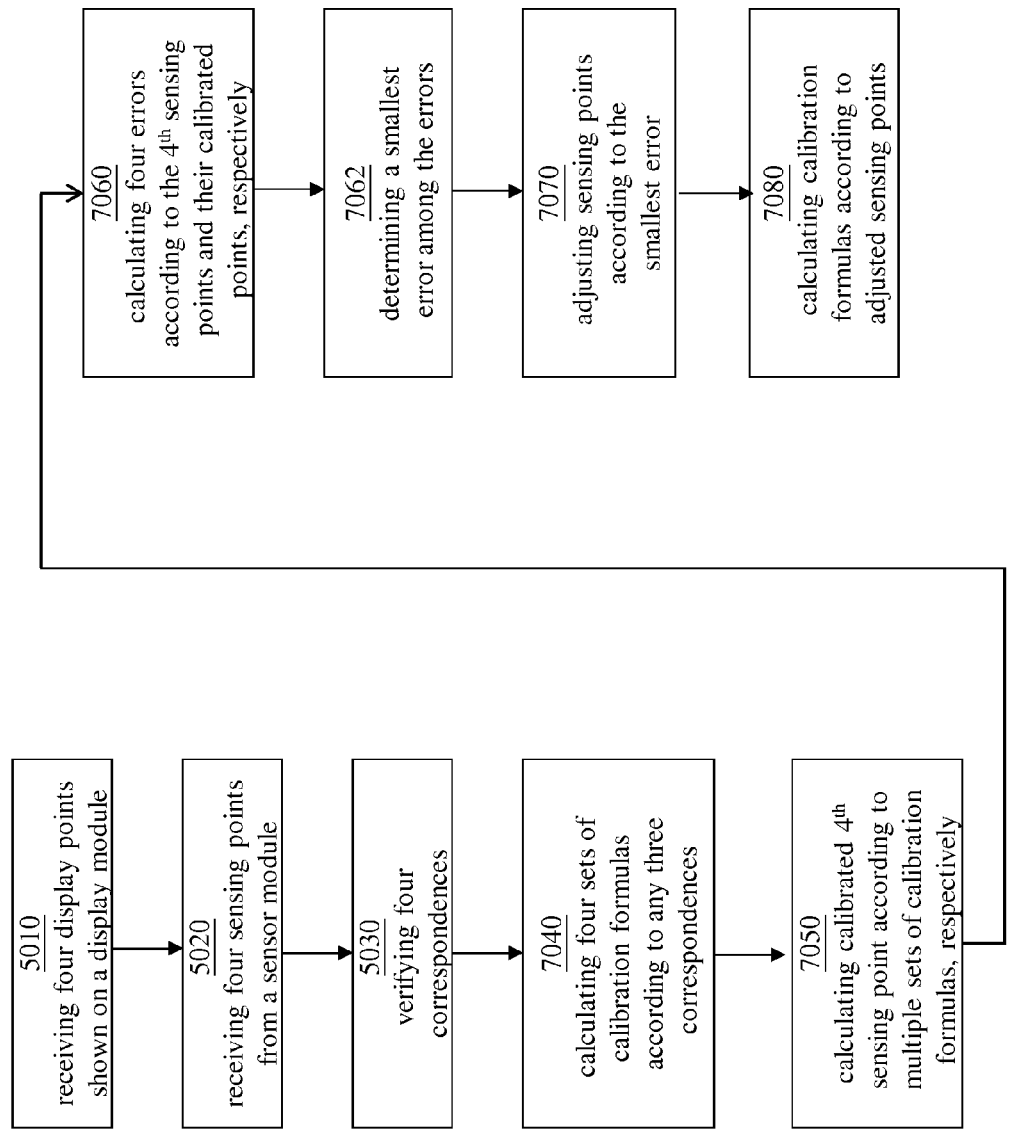
FIG. 7 illustrates a flowchart diagram of a calibration method according to an embodiment of the present invention.

Please refer to FIG. 7, which illustrates a flowchart diagram of a calibration method according to an embodiment of the present invention. Comparing with the calibration method shown in FIG. 5, Steps 5010 to 5030 shown in FIG. 7 are as the same as those steps shown in FIG. 5, no duplicated description is elaborated here. After Step 5030, Step 7040 is executed. In the fore-mentioned four correspondences, four triangles can be derived accordingly. They are listed as P1P2P3, P2P3P4, P3P4P1, and P4P1P2. Each triangle represents a set of three-pair correspondences. Hence, in Step 7040, people ordinary skilled in the art can understand the four sets of calibration formulas can be obtained by using the four sets of three-pair correspondences represented by these four triangles. In other words, it is equivalent to execute four times of Step 5040.

After receiving the four sets of calibration formulas, Step 7050 is executed in consequence. The calibrated sensing points corresponding to the fourth display point are calculated according to these four sets of calibration formulas. The fourth sensing point is U4 corresponding to the calibration formulas generated according to the first triangle P1P2P3. The fourth sensing point is U1 corresponding to the calibration formulas generated according to the second triangle P2P3P4. The fourth sensing point is U2 corresponding to the calibration formulas generated according to the third triangle P3P4P1. The fourth sensing point is U3 corresponding to the calibration formulas generated according to the fourth triangle P4P1P2. Hence, by applying the sensing points to respective calibration formulas in order to generate four calibrated values and points U'4, U'1, U'2, and U'3 accordingly.

As a result, in Step 7060, four error values or vectors, E4, E1, E2, and E3 can be generated according to the sensing points and respective calibrated sensing points. In Step 7062, the smallest error value among these four is determined. For convenience, the smallest error is assumed as E4.

As the same as Step 5070, in Step 7070, the sensing points U1, U2, and U3 are adjusted according to the smallest error value, such as E4, in order to generate three new adjusted sensing points. In the description with regard to Step 5070, at least six adjustment methods are enumerated. People ordinary skilled in the art can understand the adjustment executed in Step 7070 can use one of those six adjustment methods mentioned above or any other suitable adjustment method.

Similarly, as the same as Step 5080, in Step 7080, a new set of calibration formulas is generated according to the three adjusted sensing points. People ordinary skilled in the art can understand that the calibration method shown in FIG. 7 mainly selects a most appropriate three point combination from any combinations of the four correspondences between the display points and the sensing points and generates a first set of calibration formulas. Thus an error value is generated according to the remained sensing point and the first set of calibration formulas. At last, a final set of calibration formulas is generated according to the adjusted sensing points corresponding to the error value.

People ordinary skilled in the art can understand that although four pairs of display points and sensing points are mainly used in the calibration method shown in FIG. 7, additional pair other than the four pairs is also suitable in this invention. As long as selecting a most appropriate three-point combination among those pairs, it falls into the scope of the present invention.

Figure 8:
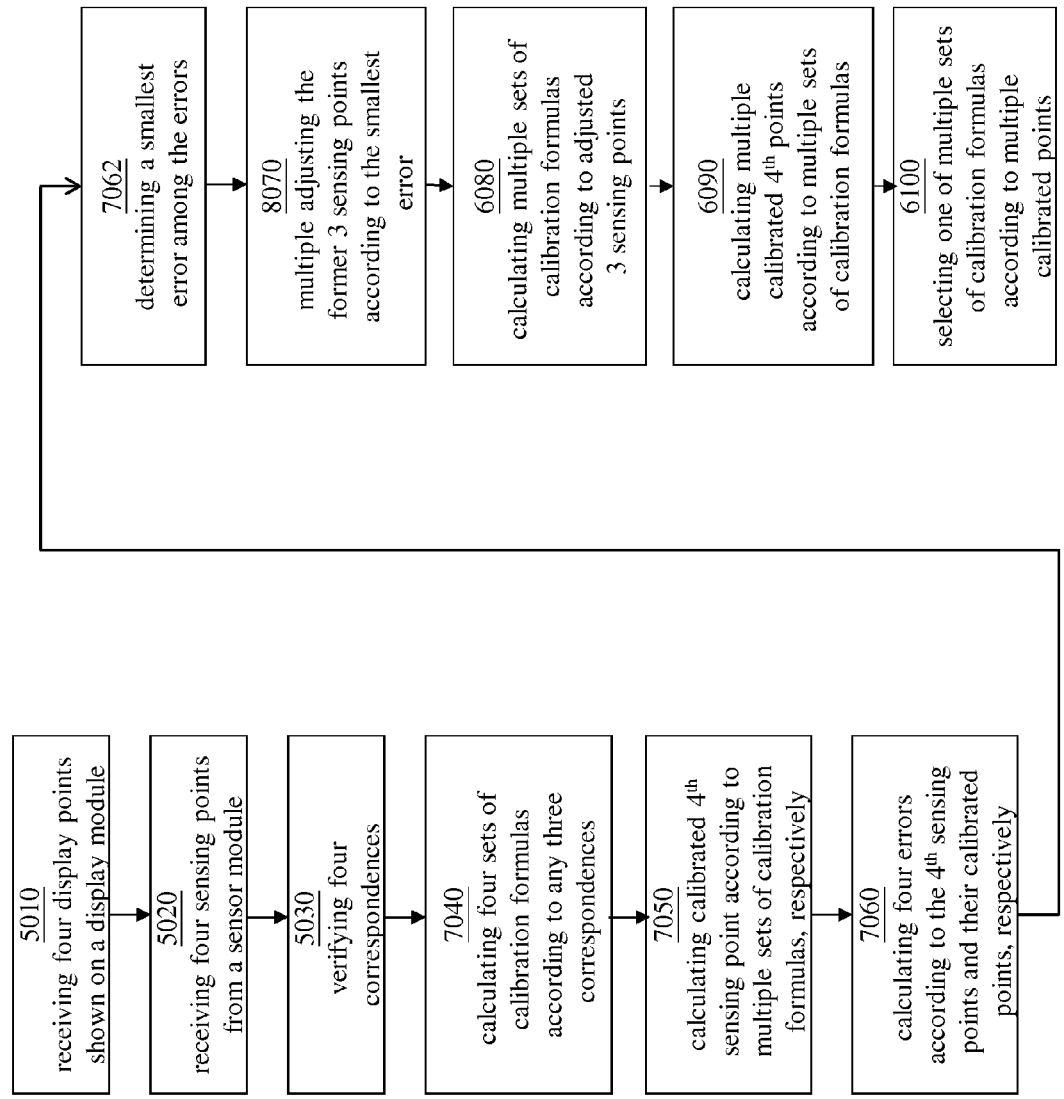
FIG. 8 illustrates a calibration method according to an embodiment of the present invention.

Please refer to FIG. 8, which illustrates a calibration method according to an embodiment of the present invention. Most steps shown in FIG. 8 are similar to those counterpart steps shown in FIG. 5, FIG. 6, and FIG. 7. The difference is at Step 8070.

As mentioned above, multiple adjustments are applied to these three sensing points U1, U2, and U3 in Step 8070. Six adjustment methods are enumerated in this invention, and it is not limited that only these six adjustment methods are applicable to this invention. Thus, the previous sensing points U1 and U3 are adjusted according to multiple adjustment methods in Step 8070. With respect to each adjustment method, multiple sets of adjusted sensing points U'1, U'2, and U'3 are generated accordingly in Step 8070. After that, the calibration method shown in FIG. 8 are as the same as the method shown in FIG. 6. No duplicated description is elaborated here.

Figure 9:
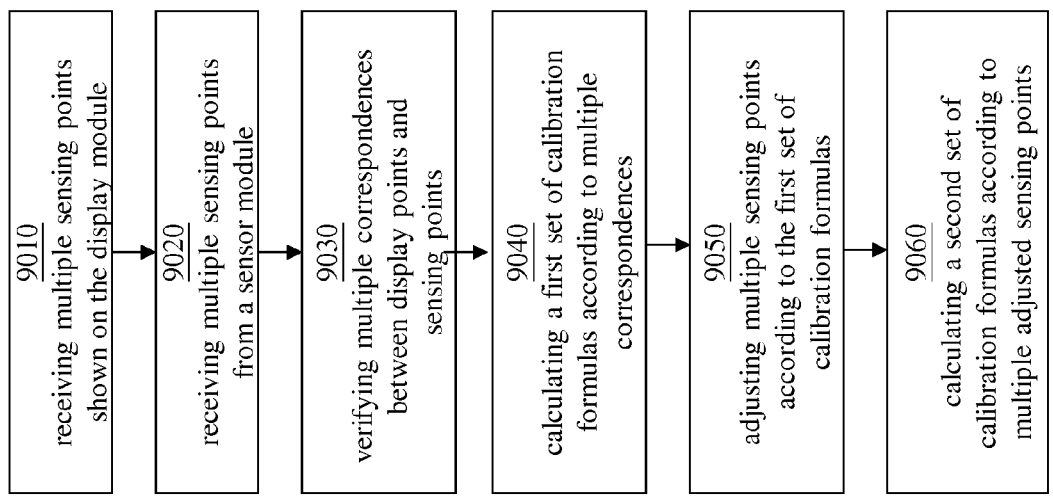
FIG. 9 illustrates a flowchart diagram of a calibration method in accordance with an embodiment of the present invention.

Please refer to FIG. 9, which illustrates a flowchart diagram of a calibration method in accordance with an embodiment of the present invention. The calibration method shown in FIG. 9 comprises a broader concept which can be deduced from the fore mentioned four calibration methods by people ordinary skilled in the art. At first, multiple coordinate values corresponding to multiple display points are received at Step 9010. In this application, multiple display points comprise four or more display points. After that, multiple coordinate values corresponding to multiple sensing points are received at Step 9020. These sensing points are corresponding to the display points, respectively, and at least four correspondences are formed accordingly. In other words, in this application, multiple sensing points comprise four or more sensing points.

In this application, the calibration method may comprise an optional Step 9030. In Step 9030, the correspondences between the display points and the sensing points are verified. If the correspondences are incorrect, the calibration method has to stop. In some circumstances, the sensor lines with respect to X axis and Y axis are installed reversely. It means that sensor lines for X axis are attached to sensors of Y axis. Hence, it may comprise of switching the coordinate values of X and Y of the sensing points in Step 9030. After switching the coordinate values of X and Y, the correspondences may be verified again. If the correspondences are correct, the calibration method goes on Step 9040. By using these multiple correspondences, three correspondences can be chosen to calculate a first set of calibration formulas, such as formula (9a) and (9b).

After the first set of calibration formulas are calculated, Step 9050 is executed consequently. Multiple sensing points are adjusted according to the first set of calibration formulas. The sensing points to be adjusted are the sensing points of the three correspondences in Step 9040. At last, using the multiple adjusted sensing points for calculating a second set of calibration formulas.

In case the sensor lines are installed reversely, the first set and the second set of calibration formulas can further comprise the calibration of reversed X axis and Y axis coordinate values. People ordinary skilled in the art can understand that switching the coordinate values of X axis and Y axis can complete the calibration of reversed X axis and Y axis coordinate values.

In one embodiment, the calibration method shown in FIG. 9 may comprise the following optional steps. As the same as Step 6070, 6080, 6090, and 6100, multiple adjustment methods are applied to multiple sensing points and multiple sets of calibration formulas are generated accordingly in Step 9050. Multiple errors are calculated with respect to respective unadjusted sensing points according to the multiple sets of calibration formulas. After that, a smallest error is chosen among these multiple errors. And the multiple sensing points are adjusted again according to the smallest error. At last, in Step 9060, the second set of calibration formulas are calculated according to the adjusted sensing points corresponding to the smallest error.

In one embodiment, in the calibration method shown in FIG. 9, the following sub steps of Step 9050 may be used to adjust the multiple sensing points. After the first set of calibration formulas are calculated in Step 9040, people ordinary skilled in the art can understand the transformation M of formula (1) is generated accordingly. By using this first set of calibration formulas, the calibrated sensing point P1 is calculated by placing the sensing point P2 into formula (1).

Hence, people ordinary skilled in the art can calculate the transformation matrix M and its inverse matrix M' according to the first set of calibration formulas. A new formula (11) is stated below:

$$P2 = M' \times P1 \qquad \text{formula (11)}$$

As a result, by placing the fourth display point D4 into formula (11), an adjusted sensing point U'4 corresponding to the fourth sensing point U4 is calculated according to the inverse matrix M'. A error E4 is calculated according to the fourth sensing point U4 and the adjusted sensing point U'4.

In one embodiment, the calibration method shown in FIG. 9 may comprise the following optional steps. As the same as Step 7040, 7050, 7060, 7062, and 7070 shown in FIG. 7, in Step 9040, multiple sets of calibration formulas can be calculated according to any three of correspondences. Multiple adjusted sensing points corresponding to the rest of sensing points are calculated according to the multiple sets of calibration formulas. After that, multiple errors corresponding to the multiple adjusted sensing points are calculated. And a smallest error is chosen among the multiple errors. At least, the set of calibration formula corresponding to the smallest error is designated as the first set of calibration formulas. The adjusted sensing points in Step 9050 are the sensing points corresponding to the three correspondences of the first set of calibration formulas.

In one embodiment, the multiple display points of the calibration method shown in FIG. 9 comprise D1, D2, D3, and D4. The multiple sensing points comprise U1, U2, U3, and U4. The multiple sensing points U1, U2, U3, and U4 are corresponding to the multiple display points D1, D2, D3, and D4, respectively, and four correspondences are formed accordingly. The first set of calibration formulas are calculated according to the former three correspondences of the four correspondences. The multiple sensing points to be adjusted are U1, U2, and U3. A error E4 is calculated according to one the following steps: the error E4 is a vector of an adjusted sensing point U'4 by placing the sensing point U4 into the first set of calibration formulas with respect to the sensing point U4; and the error E4 is a vector of an adjusted sensing point U'4 by placing the display point into an inverse matrix of a transformation matrix corresponding to the first set of calibration formulas with respect to the sensing point U4.

In one embodiment, in case the error E4 is smaller than a floor threshold, the calibration method directly designates the first set of calibration formulas as the second set of calibration formulas and ends.

In one embodiment, in case the error E4 is larger than a ceiling threshold, the calibration method ends because the touch screen is taken below quality even after calibration.

In one embodiment, adjusting the multiple sensing points according to the first set of calibration formulas comprises one of the followings calibration methods. In a first adjustment method, the adjusted sensing point U'1 is the sum of the sensing point U1 and the adjustment E4/4, the adjusted sensing point U'2 is the difference between the sensing point U2 and the adjustment E4/4, and the adjusted sensing point U'3 is the difference between the sensing point Y3 and the adjustment E4/4.

In a second adjustment method, the adjusted sensing point U'1 is the difference between the sensing point U1 and the adjustment E4/4, the adjusted sensing point U'2 is the sum of the sensing point U2 and the adjustment E4/4, and the adjusted sensing point U'3 is the difference between the sensing point U3 and the adjustment E4/4.

In a third adjustment method, the adjusted sensing point U'1 is the difference between the sensing point U1 and the adjustment E4/4, the adjusted sensing point U'2 is the difference between the sensing point U2 and the adjustment E4/4, and the adjusted sensing point U3 is the sum of the sensing point U3 and the adjustment E4/4.

In a fourth adjustment method, the adjusted sensing point U'1 is the sum of the sensing point U1 and twice of the adjustment E4/3, the adjusted sensing point U'2 is the difference between the sensing point U2 and the adjustment E4/3, and the adjusted sensing point U'3 is the difference between the sensing point U3 and the adjustment E4/3.

In a fifth adjustment method, the adjusted sensing point U'1 is the difference between the sensing point U1 and the adjustment E4/3, the adjusted sensing point U'2 is the sum of the sensing point U2 and twice of the adjustment E4/3, and the adjusted sensing point U'3 is the difference between the sensing point U3 and the adjustment E4/3.

In a sixth adjustment method, the adjusted sensing point U'1 is the difference between the sensing point U1 and the adjustment E4/3, the adjusted sensing point U'2 is the difference between the sensing point U2 and the adjustment E4/3, and the adjusted sensing point U'3 is the sum of the sensing point U'3 and twice of the adjustment E4/3.

In one embodiment, adjusting multiple sensing points according to multiple adjustment methods comprise the following calibration methods. In a first adjustment method, the adjusted sensing point U'1 is the sum of the sensing point U1 and the adjustment E4/4, the adjusted sensing point U'2 is the difference between the sensing point U2 and the adjustment E4/4, and the adjusted sensing point U'3 is the difference between the sensing point Y3 and the adjustment E4/4.

In a second adjustment method, the adjusted sensing point U'1 is the difference between the sensing point U1 and the adjustment E4/4, the adjusted sensing point U'2 is the sum of the sensing point U2 and the adjustment E4/4, and the adjusted sensing point U'3 is the difference between the sensing point U3 and the adjustment E4/4.

In a third adjustment method, the adjusted sensing point U'1 is the difference between the sensing point U1 and the adjustment E4/4, the adjusted sensing point U'2 is the difference between the sensing point U2 and the adjustment E4/4, and the adjusted sensing point U3 is the sum of the sensing point U3 and the adjustment E4/4.

In a fourth adjustment method, the adjusted sensing point U'1 is the sum of the sensing point U1 and twice of the adjustment E4/3, the adjusted sensing point U'2 is the difference between the sensing point U2 and the adjustment E4/3, and the adjusted sensing point U'3 is the difference between the sensing point U3 and the adjustment E4/3.

In a fifth adjustment method, the adjusted sensing point U'1 is the difference between the sensing point U1 and the adjustment E4/3, the adjusted sensing point U'2 is the sum of the sensing point U2 and twice of the adjustment E4/3, and the adjusted sensing point U'3 is the difference between the sensing point U3 and the adjustment E4/3.

In a sixth adjustment method, the adjusted sensing point U'1 is the difference between the sensing point U1 and the adjustment E4/3, the adjusted sensing point U'2 is the difference between the sensing point U2 and the adjustment E4/3, and the adjusted sensing point U'3 is the sum of the sensing point U'3 and twice of the adjustment E4/3.

In one embodiment, the sensor module comprises one of the following types: resistive, matrix resistive, capacitive, projected capacitive, electromagnetic sensing, infra-red sensing, surface acoustic wave, camera, and in-cell.

Figure 10:
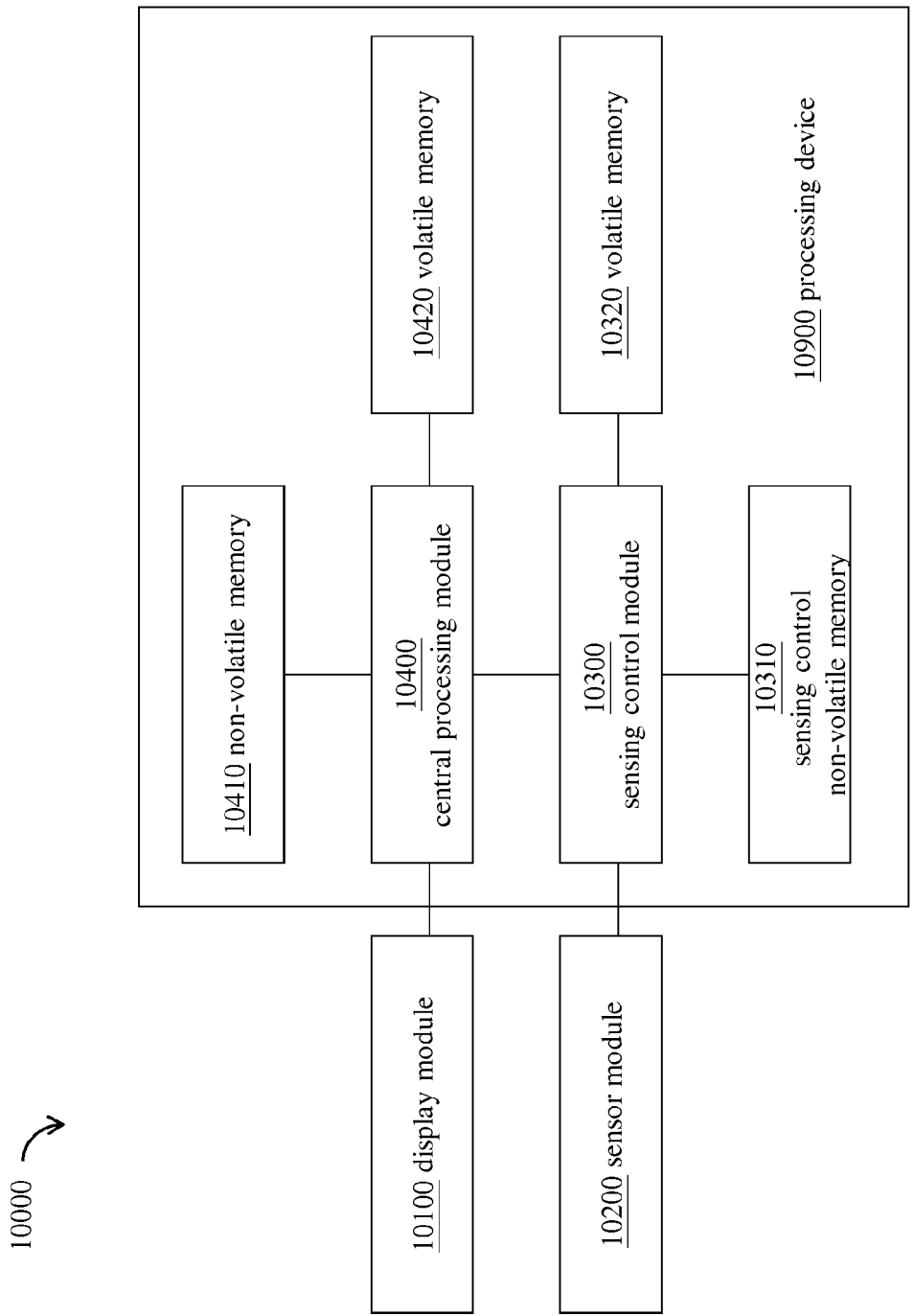
FIG. 10 shows a schematic block diagram of an electronic apparatus in accordance with an embodiment of the present invention.

Please refer to FIG. 10, which shows a schematic block diagram of an electronic apparatus in accordance with an embodiment of the present invention. The electronic apparatus 10000 may be a common mobile computing apparatus, comprising smartphone, tablet computer, and notebook computer. The electronic apparatus 10000 comprises a display module 10100 and a sensor module 10200. The coordinate systems of the display module 10100 and the sensor module 10200 are stacked. Hence, there is a need to calibrate or align these two coordinate systems.

The display module 10100 and the sensor 10200 are coupled to a processing device 10900 which comprises a central processing module 10400 and a sensing control module 10300. In one embodiment, the central processing module 10400 and the sensing control module 10300 are located in the same chip and interconnected via routed wires internal the chip. In another embodiment, the central processing module 10400 and the sensing control module 100 are located in different chips and interconnected via industrial interface. In the present application, the industrial interface comprises but not limits to the following: USB, PCI, PCI-E, I2C, SPI, Thunderbolt, Light Peak, and etc. People ordinary skilled in the art can understand the present invention does not involve the enumerated industrial interfaces which are only used to transport the signals. No further description is elaborated here.

The display module receives commands from the central processing module 10400 for displaying output screen. The central processing module 10400 may comprise image processor in order to enhance display output capability. People ordinary skilled in the art can understand that the present invention does not involve in the details. No further description is elaborated here.

The sensor module 10200 transmits the received signals to the sensing control module 10300. In one embodiment, the sensing control module 10300 can utilize logic circuits for verifying, sampling, amplifying, filtering, adjusting, and calibrating the received signals. The processed signals are transmitted to the central processing module 10400. In one embodiment, the sensing control module 10300 can comprises a programmable signal processor coupled to a sensing control non-volatile memory 10310 and a volatile memory 10320. According to the programs and configurations stored in these two memories 10310 and a0320, the signal processor performs verifying, sampling, amplifying, filtering, adjusting, and calibrating to the received signals. People ordinary skilled in the art can understand the present invention does not intend to limit the implementations of the sensing control module 10300.

The central processing module 10400 comprises a processing unit coupled to a non-volatile memory 10410 and a volatile memory 10420. The central processing module 10400 is responsible for executing an operating system, a driver responsible for coupling the sensor module, and a calibration program responsible for calibrating the touch screen. The software is stored in the non-volatile memory 10410 when the electronic apparatus 10000 is not powered. After the electronic apparatus 10000 is powered on, the software would be loaded into the volatile memory 10420 from the non-volatile memory 10410 as a part of system memory.

In one embodiment, the non-volatile memory 10410 comprises a flash memory or a read-only-memory for storing the driver, the calibrating program, and a basic input-output system (BIOS.) When the operating system is not loaded and the electronic apparatus 10000 is powered on, the driver, the calibration program, and BIOS would be loaded into the volatile memory 10420 from the non-volatile memory 10410. Both the BIOS and operating system can communicate and cooperate with the driver for receiving the input signals from the driver. Both of the software can activate the mentioned calibration program for executing calibration methods shown in FIG. 5 to FIG. 9.

When the signals processed by the sensing control module 10300 are transmitted to the central processing module 10400, it may perform calibrating on the sensing points contained in the signals. The parameters A to F contained in the calibration formulas can be stored in the mentioned non-volatile memory 10410. When the driver is loaded into the volatile memory 10420, the calibration formulas are loaded into the volatile memory 10420, too.

If user activates the calibration program via the BIOS or the operating system, the last version of calibration formulas outputted from the calibration program would be stored in the non-volatile memory 10410 and/or the volatile memory 10420 for further calibration use.

In another embodiment, the last version of calibration formulas outputted from the calibration program is not stored in the non-volatile memory 10410 and/or the volatile memory 10420. They are instead stored to the sensing control non-volatile memory 10310 and/or the volatile memory 10320 coupled to the sensing control module 10300. This is because of that the calibration is not performed by the driver executed by the central processing module 10400, it is instead performed by the sensing control module 10300. In other words, the driver does not calibrate the sensing points sent from the sensing control module 10300. The calibration procedure is already done by the sensing control module 10300.

In one embodiment of the present invention, a storage medium for calibrating touch screen is provided. The computer readable signals stored in the storage medium can command a control device of an electronic apparatus for executing a calibration method, used to calibrate a touch screen of the electronic apparatus. The touch screen comprises a display module and a sensor module. The calibration method comprises the following steps: receiving coordinate values of multiple display points shown on the display module; receiving coordinate values of multiple sensing points sent from the sensing module, the multiple sensing points are corresponding to the multiple display points, respectively, for forming at least four or more multiple correspondences. The calibration method further comprises using the multiple correspondences to calculate a first set of calibration formulas; adjusting the multiple sensing points according to the first set of calibration formulas; and calculating a second set of calibration formulas according to the multiple adjusted sensing points.

In one embodiment, the calibration method further comprises storing the second set of calibration formulas in the storage medium. The computer readable signals contained in the storage medium may command the control device for executing a driver which is configured to perform transformation on the coordinate values of the sensing points received from the sensor module.

In one embodiment, the calibration method further comprises storing the second set of calibration formulas in a sensing control storage medium. The electronic apparatus is further coupled to the sensing control module coupled to the sensor module and the sensing control storage medium. The sensing control module uses the second set of calibration formulas to perform transformation on the coordinate values of the sensing points received from the sensor module.

The present invention provides an electronic apparatus for calibrating a touch screen. The electronic apparatus comprises a storage medium. The computer readable signals contained in the storage medium commands a control device of the electronic apparatus for executing a calibration method for calibrating a touch screen of the electronic apparatus. The touch screen comprises a display module and a sensor module. The calibration method comprises the following steps: receiving coordinate values of multiple display points shown on the display module; receiving coordinate values of multiple sensing points sent from the sensing module, the multiple sensing points are corresponding to the multiple display points, respectively, for forming at least four or more multiple correspondences. The calibration method further comprises using the multiple correspondences to calculate a first set of calibration formulas; adjusting the multiple sensing points according to the first set of calibration formulas; and calculating a second set of calibration formulas according to the multiple adjusted sensing points.

In one embodiment, the calibration method further comprises storing the second set of calibration formulas in the storage medium. The computer readable signals contained in the storage medium may command the control device for executing a driver which is configured to perform transformation on the coordinate values of the sensing points received from the sensor module.

In one embodiment, the calibration method further comprises storing the second set of calibration formulas in a sensing control storage medium. The electronic apparatus is further coupled to the sensing control module coupled to the sensor module and the sensing control storage medium. The sensing control module uses the second set of calibration formulas to perform transformation on the coordinate values of the sensing points received from the sensor module.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A calibration method of a touch screen, wherein the touch screen comprises a display module and a sensor module, the calibration method comprising:
    receiving coordinate values of multiple display points shown on the display module;
    receiving coordinate values of multiple sensing points received by the sensor module, wherein the multiple sensing points are corresponding to the multiple display points, respectively, for forming at least four multiple correspondences;
    calculating a first set of calibration formulas according to the multiple correspondences;
    adjusting the multiple sensing points according to the first set of calibration formulas to generate adjusted multiple sensing points; and
    calculating a second set of calibration formulas according to the adjusted multiple sensing points.

2. The calibration method of claim 1, further comprising verifying the multiple correspondences in response to receiving the multiple sensing points and the multiple display points.

3. The calibration method of claim 2, wherein the verifying step further comprising switching coordinate values of the multiple sensing points, the first set and the second set of calibration formulas further comprising calibrating the switching of coordinate values of X axis and Y axis.

4. The calibration method of claim 1, wherein the adjusted multiple sensing points are the sensing points corresponding to the three correspondences in the calculating the first set of calibration formulas.

5. The calibration method of claim 1, wherein the adjusting the multiple sensing points according to the first set of calibration formulas further comprising:
- performing multiple adjustment methods on the multiple sensing points; calculating multiple sets of calibration formulas according to the adjusted multiple sensing points;
- calculating multiple errors corresponding to multiple unadjusted sensing points according to the multiple sets of calibration formulas;
- determining a smallest error among the multiple errors; and
- adjusting the multiple sensing points according to the smallest error.

6. The calibration method of claim 1, wherein the adjusting the multiple sensing points according to the first set of calibration formulas further comprising:
- calculating multiple sets of calibration formulas according to any combination of three correspondences;
- calculating multiple calibrated points corresponding to another sensing point according to the multiple sets of calibration formulas;
- calculating multiple errors according to the multiple calibrated points;
- determining a smallest error among the multiple errors; and
- setting the set of calibration formulas corresponding to the smallest error as the first set of calibration formulas.

7. The calibration method of claim 1, wherein the multiple display points comprise D1, D2, D3, and D4, the multiple sensing points comprise U1, U2, U3, and U4, the multiple sensing points are corresponding to the multiple display points, respectively, to form at least four correspondences,
- wherein the first set of calibration formulas is calculated according to the former three correspondences of the four correspondences, wherein the adjusted multiple sensing points are U1, U2, and U3, an error E4 is calculated according to one of the following steps:
  - the error E4 is a vector of the calibrated point U'4 by placing the sensing point into the first set of calibration formulas with respect to the sensing point U4; and
  - the error E4 is a vector of an adjusted sensing point U'4 generated by placing the display point D4 into an inverse matrix of a transformation matrix corresponding to the first set of calibration formulas with respect to the sensing point U4.

8. The calibration method of claim 7, wherein in case the error E4 is smaller than a floor threshold, the calibration method directly sets the second set of calibration formulas as the first set of calibration formulas and ends.

9. The calibration method of claim 7, wherein in case the error E4 is larger than a ceiling threshold, the calibration method ends because the touch screen is taken as below quality even after calibration.

10. The calibration method of claim 7, wherein the adjusting the multiple sensing points according to the first set of calibration formulas comprises one of the followings:
- a first adjustment method, the adjusted sensing point U'1 is the sum of the sensing point U1 and the adjustment E4/4, the adjusted sensing point U'2 is the difference between the sensing point U2 and the adjustment E4/4, and the adjusted sensing point U'3 is the difference between the sensing point Y3 and the adjustment E4/4;
- a second adjustment method, the adjusted sensing point U'1 is the difference between the sensing point U1 and the adjustment E4/4, the adjusted sensing point U'2 is the sum of the sensing point U2 and the adjustment E4/4, and the adjusted sensing point U'3 is the difference between the sensing point U3 and the adjustment E4/4;
- a third adjustment method, the adjusted sensing point U'1 is the difference between the sensing point U1 and the adjustment E4/4, the adjusted sensing point U'2 is the difference between the sensing point U2 and the adjustment E4/4, and the adjusted sensing point U3 is the sum of the sensing point U3 and the adjustment E4/4;
- a fourth adjustment method, the adjusted sensing point U'1 is the sum of the sensing point U1 and twice of the adjustment E4/3, the adjusted sensing point U'2 is the difference between the sensing point U2 and the adjustment E4/3, and the adjusted sensing point U'3 is the difference between the sensing point U3 and the adjustment E4/3;
- a fifth adjustment method, the adjusted sensing point U'1 is the difference between the sensing point Ul and the adjustment E4/3, the adjusted sensing point U'2 is the sum of the sensing point U2 and twice of the adjustment E4/3, and the adjusted sensing point U'3 is the difference between the sensing point U3 and the adjustment E4/3; and
- a sixth adjustment method, the adjusted sensing point U'1 is the difference between the sensing point U1 and the adjustment E4/3, the adjusted sensing point U'2 is the difference between the sensing point U2 and the adjustment E4/3, and the adjusted sensing point U'3 is the sum of the sensing point U'3 and twice of the adjustment E4/3.

11. The calibration method of claim 5, wherein the multiple sensing points comprise U1, U2, U3, and U4, the first set of calibration formulas are calculated according to the first set of calibration formulas, an error E4 is calculated according to one of the following steps:
- the error E4 is a vector of the calibrated point U'4 by placing the sensing point into the first set of calibration formulas with respect to the sensing point U4; and
- the error E4 is a vector of an adjusted sensing point U'4 generated by placing the display point D4 into an inverse matrix of a transformation matrix corresponding to the first set of calibration formulas with respect to the sensing point U4,
- wherein the adjusting the multiple sensing points according to the multiple adjustment methods comprises one of the followings:
  - a first adjustment method, the adjusted sensing point U'1 is the sum of the sensing point U1 and the adjustment E4/4, the adjusted sensing point U'2 is the difference between the sensing point U2 and the adjustment E4/4, and the adjusted sensing point U'3 is the difference between the sensing point Y3 and the adjustment E4/4;
  - a second adjustment method, the adjusted sensing point U'1 is the difference between the sensing point U1 and the adjustment E4/4, the adjusted sensing point U'2 is the sum of the sensing point U2 and the adjustment E4/4, and the adjusted sensing point U'3 is the difference between the sensing point U3 and the adjustment E4/4;
  - a third adjustment method, the adjusted sensing point U'1 is the difference between the sensing point U1 and the adjustment E4/4, the adjusted sensing point U'2 is the difference between the sensing point U2 and the adjustment E4/4, and the adjusted sensing point U3 is the sum of the sensing point U3 and the adjustment E4/4;

a fourth adjustment method, the adjusted sensing point U'1 is the sum of the sensing point U1 and twice of the adjustment E4/3, the adjusted sensing point U'2 is the difference between the sensing point U2 and the adjustment E4/3, and the adjusted sensing point U'3 is the difference between the sensing point U3 and the adjustment E4/3;

a fifth adjustment method, the adjusted sensing point U'1 is the difference between the sensing point U1 and the adjustment E4/3, the adjusted sensing point U'2 is the sum of the sensing point U2 and twice of the adjustment E4/3, and the adjusted sensing point U'3 is the difference between the sensing point U3 and the adjustment E4/3; and a sixth adjustment method, the adjusted sensing point U'1 is the difference between the sensing point U1 and the adjustment E4/3, the adjusted sensing point U'2 is the difference between the sensing point U2 and the adjustment E4/3, and the adjusted sensing point U'3 is the sum of the sensing point U'3 and twice of the adjustment E4/3.

12. The calibration method of claim 1, wherein the sensor module comprises one of the following types: resistive, matrix resistive, capacitive, projected capacitive, electromagnetic sensing, infra-red sensing, surface acoustic wave, camera, and in-cell.

13. A processing device, comprising:
a sensing control module, coupled to a sensor module of a touch screen, configured to receive coordinate values of multiple sensing points on the sensor module; and
a central processing module, coupled to a display module of the touch screen and the sensing control module, configured to have the display module for displaying multiple display points, wherein the multiple sensing points are corresponding to the multiple display points, respectively, for forming at least four multiple correspondences; to calculate a first set of calibration formulas according to the multiple correspondences; to adjust the multiple sensing points according to the first set of calibration formulas to generate adjusted multiple sensing points; and to calculate a second set of calibration formulas according to the adjusted multiple sensing points.

14. A sensing control module, coupled to a sensor module of a touch screen and a central processing module, wherein the central processing module is coupled to a display module of the touch screen and configured to have the display module for displaying multiple display points, the sensing control module is configured to:
receive coordinate values of the multiple display points shown on the display module from the central processing module;
receive coordinate values of multiple sensing points on the sensor module, wherein the multiple sensing points are corresponding to the multiple display points, respectively, for forming at least four multiple correspondences;
calculate a first set of calibration formulas according to the multiple correspondences;
adjust the multiple sensing points according to the first set of calibration formulas to generate adjusted multiple sensing points; and
calculate a second set of calibration formulas according to the adjusted multiple sensing points.

* * * * *